United States Patent
Paddon et al.

(10) Patent No.: US 8,774,761 B2
(45) Date of Patent: Jul. 8, 2014

(54) MOBILE DEVICE TO DETECT UNEXPECTED BEHAVIOUR

(75) Inventors: Michael William Paddon, Tokyo (JP); Matthew C. Duggan, Tokyo (JP); Jessica M. Flanagan, Ashfield (AU)

(73) Assignee: QUALCOMM Incorporated, San Diego, CA (US)

( * ) Notice: Subject to any disclaimer, the term of this patent is extended or adjusted under 35 U.S.C. 154(b) by 83 days.

(21) Appl. No.: 13/360,446

(22) Filed: Jan. 27, 2012

(65) Prior Publication Data

US 2013/0196649 A1 Aug. 1, 2013

(51) Int. Cl.
*H04M 1/677* (2006.01)

(52) U.S. Cl.
USPC .......... 455/410; 455/411; 455/414.1; 726/22; 726/23; 726/24

(58) Field of Classification Search
USPC ....................... 455/410, 411, 414.1
See application file for complete search history.

(56) References Cited

U.S. PATENT DOCUMENTS

| | | |
|---|---|---|
| 2005/0190059 A1 | 9/2005 | Wehrenberg |
| 2006/0084428 A1* | 4/2006 | Lee ................. 455/423 |
| 2007/0123214 A1 | 5/2007 | Mock |
| 2007/0250930 A1 | 10/2007 | Aziz et al. |
| 2009/0083826 A1 | 3/2009 | Baribault |
| 2009/0199296 A1 | 8/2009 | Xie et al. |
| 2009/0253406 A1 | 10/2009 | Fitzgerald et al. |
| 2009/0253410 A1* | 10/2009 | Fitzgerald et al. ............ 455/411 |
| 2010/0058470 A1* | 3/2010 | Kim ................................. 726/22 |
| 2010/0075632 A1* | 3/2010 | Kim .............................. 455/410 |
| 2013/0052992 A1* | 2/2013 | Lee et al. ...................... 455/411 |

FOREIGN PATENT DOCUMENTS

EP 1971102 A1 9/2008

OTHER PUBLICATIONS

Chow et al. "Authentication in the Clouds: A Framework and its Application to Mobile Users". Proceedings of the 2010 ACM workshop on Cloud computing security workshop [Online] 2010, pp. 1-6.
International Search Report and Written Opinion—PCT/US2013/023347—ISA/EPO—Jul. 5, 2013.

* cited by examiner

*Primary Examiner* — Kiet Doan
*Assistant Examiner* — Mazda Sabouri
(74) *Attorney, Agent, or Firm* — Thien T. Nguyen

(57) ABSTRACT

Disclosed is an apparatus and method for a mobile device to detect unexpected behavior associated with the mobile device. The mobile device may include a memory and a processor coupled to the memory. The processor may be configured to monitor at least one of physical conditions and/or device actions associated with the mobile device. If a call or a data transmission is requested, the processor may be configured to compare the monitored physical conditions and/or device actions to an anomaly threshold value and may execute an anomaly exception routine if the anomaly threshold value is exceeded.

44 Claims, 4 Drawing Sheets

MOBILE DEVICE TO DETECT UNEXPECTED BEHAVIOUR

BACKGROUND

1. Field

The present invention relates generally to a mobile device capable of detecting unexpected behavior associated with the mobile device.

2. Relevant Background

Today, the use of mobile electronic devices is widespread. Such mobile electronic devices can increase a user's productivity and quality of life, but they are also susceptible to loss, theft or unauthorized use. Examples of such devices are smart phones, cellular phones, portable digital systems (PDAs), digital cameras, tablets, mobile computers, etc. (hereinafter referred to as mobile devices).

Mobile devices are often used to run diverse applications which originate from many sources. Unfortunately, applications with malicious intent (e.g., malware) are sometimes installed by users onto their mobile device. Users are typically unaware of this. As an example, a subset of malware is characterized by transmissions that debit the telecommunication account associated with the mobile device, usually in an attempt to generate revenue for the attacker. For example, the malware may send a short message service (SMS) message or place a call to a premium number (often in a remote jurisdiction). Unfortunately, by the time that the attack is typically detected, a significant debit or loss has occurred. Redress from entities in remote jurisdictions may be difficult or impossible, leaving the account holder, or their carrier, liable for the fraud. Therefore, a need exists for countermeasures against this type of attack.

Previous attempts have been made to stop attacks against mobile devices. For example, many mobile device operating systems (OSs) run applications in a "sandbox" that is intended to prevent unauthorized or undesirable behavior. Unfortunately, there are often legitimate applications that wish to be able to send SMS messages or place calls, so many operating systems allow this functionality for approved applications. Therefore, the attacker can simply encourage or mislead the user to supply such approval, authorization, or agreement in a permission request.

However, users are typically not motivated enough to thoroughly read, understand, or predict the effect of fine grained permission requests and often do not read authorization requests requested by the installer of an application. An attacker may therefore present a desirable application with a plausible request for authorizations, such as placing calls or sending SMS messages, and many users unfortunately agree, without even reading the agreement or the request for authorization. This type of agreement is even easier to get approval from a user if the user is presented with a bewildering and long list of fine grained permission requests. There is therefore a need for techniques for mobile devices to detect unexpected behavior and to stop the unexpected behavior and/or notify the user of the mobile device of such unexpected behavior.

SUMMARY

Aspects of the invention may relate to a mobile device that detects unexpected behavior associated with the mobile device. The mobile device may include a memory and a processor coupled to the memory. The processor may be configured to monitor at least one of physical conditions and/or device actions associated with the mobile device. If a call or a data transmission is requested, the processor may be configured to compare the monitored physical conditions and/or device actions to an anomaly threshold value and may execute an anomaly exception routine if the anomaly threshold value is exceeded.

In another aspect, a method for a mobile device to detect unexpected behavior associated with the mobile device is disclosed. The method includes performing a monitoring process to monitor at least one of physical conditions and/or device actions associated with the mobile device. If a call or a data transmission is requested, the method includes performing an anomaly handling process to compare the monitored physical conditions and/or device actions to an anomaly threshold value and performing an anomaly exception routine if the anomaly threshold value is exceeded.

In yet another aspect, a computer program product is disclosed that includes a computer-readable medium comprising code for performing a monitoring process to monitor at least one of physical conditions and/or device actions associated with a mobile device. If a call or a data transmission is requested, the code performs an anomaly handling process to compare the monitored physical conditions and/or device actions to an anomaly threshold value and performs an anomaly exception routine if the anomaly threshold value is exceeded.

In another aspect, a mobile device is disclosed that includes means for performing a monitoring process to monitor at least one of physical conditions and/or device actions associated with the mobile device. Further, the mobile device includes means for performing an anomaly handling process to compare the monitored physical conditions and/or device actions of the monitoring process to an anomaly threshold value. The mobile device additionally includes means for performing an anomaly exception routine if the anomaly threshold value is exceeded.

DETAILED DESCRIPTION

The word "exemplary" is used herein to mean "serving as an example, instance, or illustration." Any aspect or embodiment described herein as "exemplary" or as an "example" in not necessarily to be construed as preferred or advantageous over other aspects or embodiments.

Figure 1:
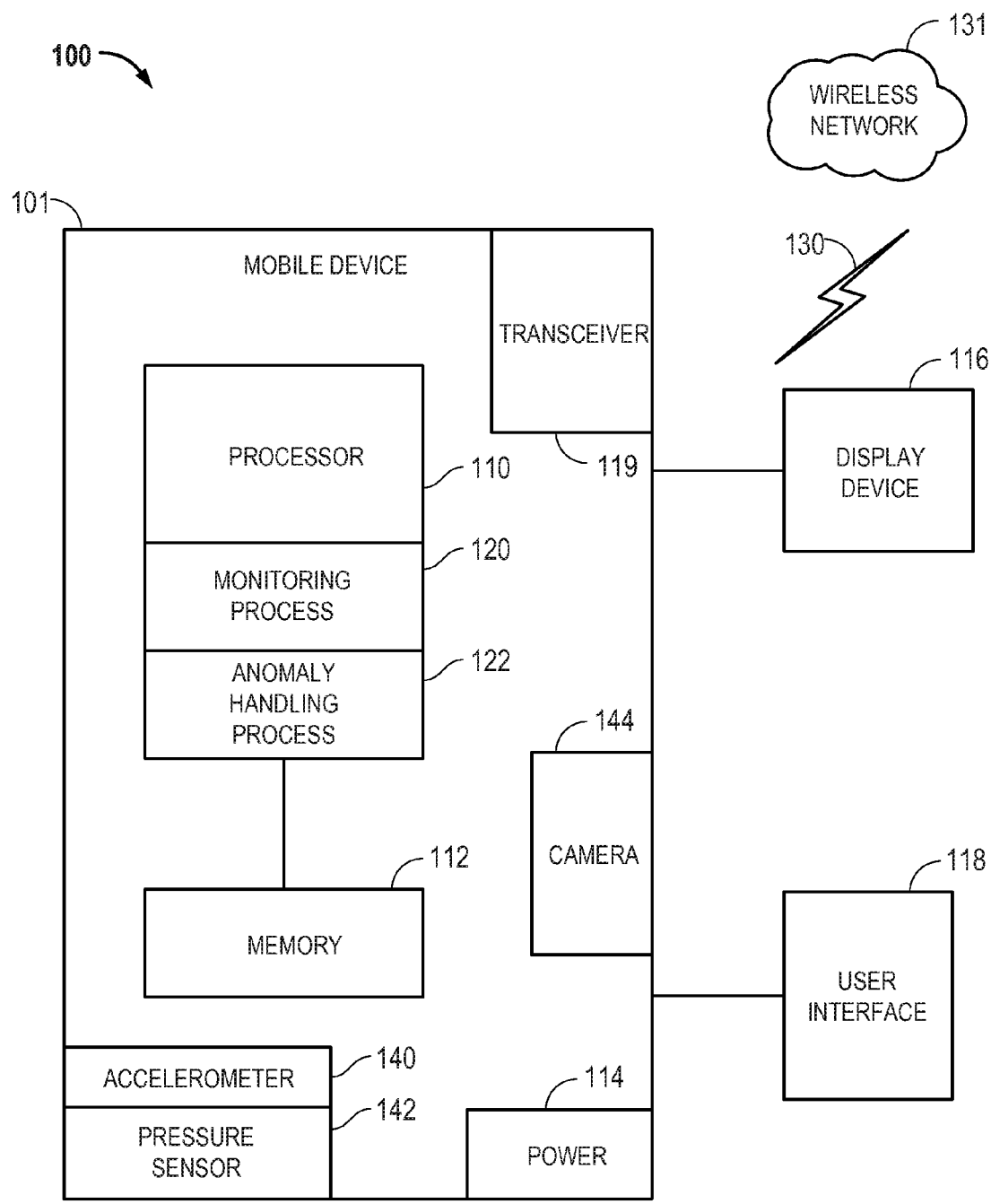
FIG. 1 is a block diagram of a system in which aspects of the invention may be practiced.

With reference to FIG. 1, FIG. 1 is block diagram of system 100 in which aspects of the invention may be practiced. In particular, system 100 illustrates a mobile device 101 that provides unexpected behavior detection and notification to a user of the mobile device 101 of such unexpected behavior. Further, mobile device 101 may stop the unexpected behavior of the mobile device 101. For example, unexpected behavior may refer to a call or a data transmission being automatically performed without approval by the user. Further, as an example, a call may be made to an unknown number or a data transmission may be made to an unknown entity, in which unknown generally refers to a number or entity that has never been communicated with before by the mobile device 101. This unexpected behavior may be referred to as an anomaly as will be hereinafter described.

Mobile device 101 may include a processor 110, a memory 112, a power device 114, a display device 116, a user interface 118, a transceiver 119, an accelerometer 140, a pressure sensor 142, and a camera 144. It should be appreciated that the display device 116 may be a typical display device on a mobile device 101 such as a cell phone, personal digital assistant, mobile computer, tablet, etc. User interface 118 may be a keyboard, touch-screen, or another type of user interface input device. Further, power device 114 may be a battery device to power mobile device 101. Transceiver 119 may be used to transmit and receive calls and data through wireless link 130 to/from a wireless network 131.

In particular, mobile device 101 may include a processor 110 configured to execute instructions for implementing a monitoring process 120 and an anomaly handling process 122. Memory 112 may be coupled to processor 110 to store instructions for implementation/execution by processor 110. In one aspect, mobile device 101 may include a processor 110 that is configured to execute instructions to: implement the monitoring process 120 to monitor at least one of physical conditions associated with the mobile device 101 and/or device actions associated with the mobile device 101 and to implement the anomaly handling process 122.

If a call or a data transmission is requested, the anomaly handling process 122 compares the monitored physical conditions or devices actions of the monitoring process 120 to an anomaly threshold value. If the anomaly threshold value is exceeded, the processor executes or implements an anomaly exception routine, as will be further described in detail. Thus, the anomaly exception routine may be triggered if the anomaly threshold value is exceeded. Aspects of monitored physical conditions, monitored device actions, the monitoring process, the anomaly handling process, and the anomaly exception routine will be hereinafter described in more detail. It should be appreciated that these processes may be executed, implemented, performed, etc. by the processor 110 and that these terms are used interchangeably.

In one aspect, the anomaly exception routine may include requiring a user to enter a confirmation of the requested call or data transmission through the user interface 118. For example, the user may be required to enter a confirmation (e.g., yes/no) through the user interface 118 to allow for the transmission of the call or for the data transmission. It should be appreciated that the call or the data transmission may occur via the link 130 and through the wireless network 131.

Further, the anomaly exception routine may notify/alert a user of the requested call or data transmission by a visual display on the display device 116 or an audio sound via a microphone or other audio sources. The anomaly exception routine may also disable the mobile device 101, such as disabling power by power device 114, if a requested call or a data transmission occurs. Also, processor 110 may lock the mobile device 101. In this way, mobile device 101 may provide techniques to detect unexpected behavior (e.g., requested calls to unknown numbers or data transmissions to unknown entities that are being performed without approval by the user) and to stop the unexpected behavior and/or notify the user of the mobile device of such unexpected behavior. However, unexpected behavior may also refer to a requested call to an unknown number or a data transmission to an unknown entity that is being requested by the user. As an example, the user may be attempting to make a call or a data transmission to unknown entity that has been inserted (by an attacker) into the mobile device 101.

It should be appreciated that aspects of the invention as will be hereinafter described may be implemented in conjunction with the execution of instructions by processor 110 of mobile device 101 and/or other circuitry of the mobile device 101 and/or other devices. Particularly, circuitry of the mobile device 101, including but not limited to processor 110, may operate under the control of a program, routine, or the execution of instructions to execute methods or processes in accordance with embodiments of the invention. For example, such a program may be implemented in firmware or software (e.g. stored in memory 112 and/or other locations) and may be implemented by processors, such as processor 110, and/or other circuitry of mobile device 101. Further, it should be appreciated that the terms processor, microprocessor, circuitry, controller, etc., refer to any type of logic or circuitry capable of executing logic, commands, instructions, software, firmware, functionality, etc.

Further, mobile or wireless device 101 may communicate via one or more wireless communication links 130 through a wireless network 131 that are based on or otherwise support any suitable wireless communication technology. For example, in some aspects mobile device 101 may associate with a network including a wireless network 131. In some aspects the network may comprise a body area network or a personal area network (e.g., an ultra-wideband network). In some aspects the network may comprise a local area network or a wide area network. A wireless device may support or otherwise use one or more of a variety of wireless communication technologies, protocols, or standards such as, for example, CDMA, TDMA, OFDM, OFDMA, WiMAX, and Wi-Fi. Similarly, a wireless device may support or otherwise use one or more of a variety of corresponding modulation or multiplexing schemes. A wireless device may thus include appropriate components (e.g., air interfaces) to establish and communicate via one or more wireless communication links using the above or other wireless communication technologies. For example, a device may comprise a wireless transceiver with associated transmitter and receiver components (e.g., a transmitter and a receiver) that may include various components (e.g., signal generators and signal processors) that facilitate communication over a wireless medium. As is well known, a mobile wireless device 101 may therefore wirelessly communicate with other mobile devices, cell phones, other wired and wireless computers, Internet websites, etc.

According to aspects of the invention, if a call or data transmission is requested via a wireless communication link 130 through a network including a wireless network 131, the anomaly handling process 122 may be executed to compare monitored physical conditions and/or device actions of the monitoring process 120 to an anomaly threshold value, such that, if the anomaly threshold value is exceeded, an anomaly exception routine may be executed, implemented or triggered. The anomaly exception routine may perform actions, processes, or functions such as requesting user confirmation, logging the anomaly, signaling the anomaly to a user by a visual or audio alarm, or possibly even disabling the mobile device 101. As described herein, many environmental cues (physical conditions and/or device actions) may be monitored, such as: motion, pressure, light presence, the timing of previous calls, text messages, application usage, Internet usage, etc. By monitoring these cues, it may be determined whether a call or data transmission may be an anomalous call or data transmission and appropriate action may be taken.

This can prevent an attacker from charging unwanted calls and data transmissions to a mobile device owner or the associated carrier.

It should be appreciated that a data transmission may be any sort of data transmission, however, in one aspect, it may be related in particular to a text message, such as an SMS message. Hereinafter, the term data transmission will be referred to as a text message. However, it should be appreciated that aspects of the invention relate to any data transmission/message.

Examples of monitored physical conditions of mobile device 101 by monitoring process 120 will be hereinafter described. As one example, a monitored physical condition may be the use of the user interface 118 by a user. This may include typing by a user, a user touching their touch-screen, a user making phone calls, a user accessing the Internet, a user transmitting text messages, etc. As another example of a monitored physical condition, movement of the mobile device 101 may be monitored by the monitoring process 120. In one implementation, mobile device 101 may include an accelerometer 140. The monitoring process 120 may monitor the accelerometer 140 to determine whether movement of the mobile device 101 has taken place and to what extent the movement has taken place.

As another example of a monitored physical condition, mobile device 101 may include a pressure sensor 142. In this example, a monitored physical condition by the monitoring process 120 may be based upon pressure sensor readings of pressure sensor 142 of the mobile device 101. This may be used to indicate whether the mobile device 101 has recently been held by a user, placed in a pocket of the user, or otherwise utilized by the user.

Figure 2A:
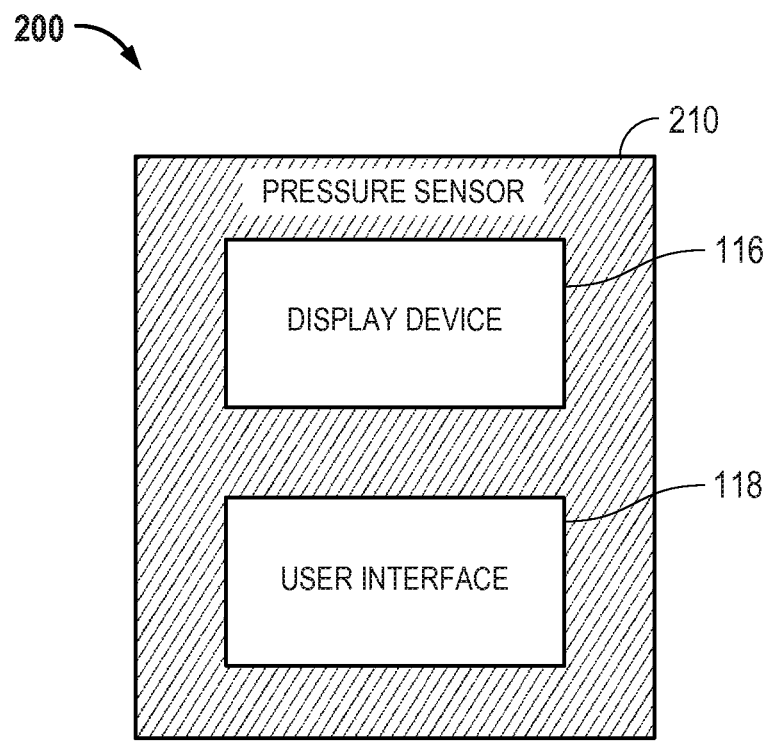
FIG. 2A is a block diagram of a front side of the mobile device having a pressure sensor.
Figure 2B:
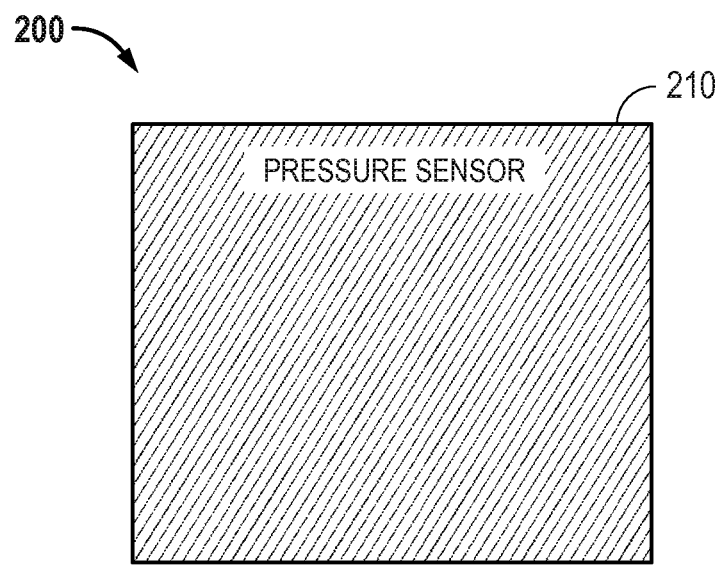
FIG. 2B is a block diagram of a back side of the mobile device having a pressure sensor.

With brief additional reference to FIGS. 2A-2B, block diagrams of a front side and a back side of the mobile device 101 are shown that illustrate a pressure sensor 210 of the mobile device that may be utilized. Pressure sensor 210 is an example of pressure sensor 142. As can be seen in FIG. 2A, a front side of the exemplary mobile device 101 is shown having a display device 116, a user interface 118, and pressure sensor 210. Reference can also be made to FIG. 2B which shows a back side of the mobile device 110 with pressure sensor 210.

In one aspect, monitoring process 120 may monitor physical conditions based upon pressure sensor readings of pressure sensor 210. The pressure sensor 210 may be mounted on one or more of the front side (FIG. 2A), the back side (FIG. 2B), and/or the sides of the mobile device 101. The pressure sensor 210 may be located at all of these portions, some of these portions, or only at certain portions of these positions, dependent upon design and implementation procedures. As examples, pressure sensor 210 may be a resistive pressure sensor or a capacitive pressure sensor or a combination of both. Pressure sensor 210 may be a pressure sensitive material that allows for pressure on the front, back, or sides of the mobile device 101 to be measured.

Pressure sensor 210 may be utilized to measure at least one of finger pressure, grip pressure, number of fingers being used, left-hand use, right-hand use, multiple hand use, location, and the position of the mobile device 101 (e.g., portrait or landscape position). Based upon the pressure information from the front, back, or sides of the pressure sensor 210 of the mobile device 101, the monitor process 120 to monitor physical conditions associated with the mobile device 101 may determine whether the mobile device 101 has been recently used or carried by the user or if the mobile device has not been in use. These types of pressure sensors 210 may be resistive or capacitive. Further, as an example, these type of pressure sensors 210 may be formed from chemical membranes and may be made from a clear material such that they are unseen by the mobile device user. In particular, the pressure sensor 210 may be utilized to determine if the mobile device 101 has been recently held or carried in a pocket, purse, briefcase, etc, by the monitoring process 120. It should be apparent to those skilled in the art, that a wide variety of different types of pressure sensor measuring schemes may be utilized.

As other examples of monitored physical conditions by monitoring process 120, mobile device 101 may include a camera 144. With the use of camera 144, a monitored physical condition may be based upon external environmental light presence or light from the display device 116 as measured by camera 144. Additionally, other device actions of the mobile device 101 may be monitored by the monitoring process 120 of processor 110 such as, calls, text messages, application usage, or Internet usage.

In additional aspects, weighting factors may be selected for the monitored physical conditions and the monitored device actions in the anomaly handling process 122 to determine if an anomaly threshold value is exceeded. For example, when previous calls or text messages have been approved by a user after the anomaly threshold has been met and the anomaly exception routine has been implemented, then the weighting factors may be increased for the monitored physical conditions and the monitored device actions in the anomaly handling process 122. Examples of this type of implementation will be described in more detail later.

It should be appreciated that aspects of the invention do not replace authorizations by the mobile device 110, but rather work independently and in addition to them. Multiple independent security mechanisms provide defense and present an attacker with a significantly greater challenge. Aspects of the invention focus on typical environmental cues that are present when a user intends to place a phone call or send a text message (or any similar action). One cue is that the mobile device 110 is normally being physically manipulated which may be sensed by the internal accelerometer 140, pressure sensor 142, 210, etc. Another cue is that buttons are physically pushed or, in the case of a touch-sensitive device, a surface is being physically touched which may be measured by the user interface 118 or via pressure sensors 142, 210. Another cue is the presence of visible light, both from the environment and the display device 116, which may be sensed by camera 144. Another cue is time differences between typical device actions (calls, text messages, application usage, Internet usage, etc.). When some or all of these environmental cues are not present, the action of sending a message or placing a call may be anomalous as determined by the anomaly handling process 122. In other words, this may be an attack to make calls or send messages to an entity that is not approved by the user. Techniques described herein are utilized to prevent an attacker from charging unwanted calls and data transmissions/text messages to a mobile device user or carrier.

Figure 3:
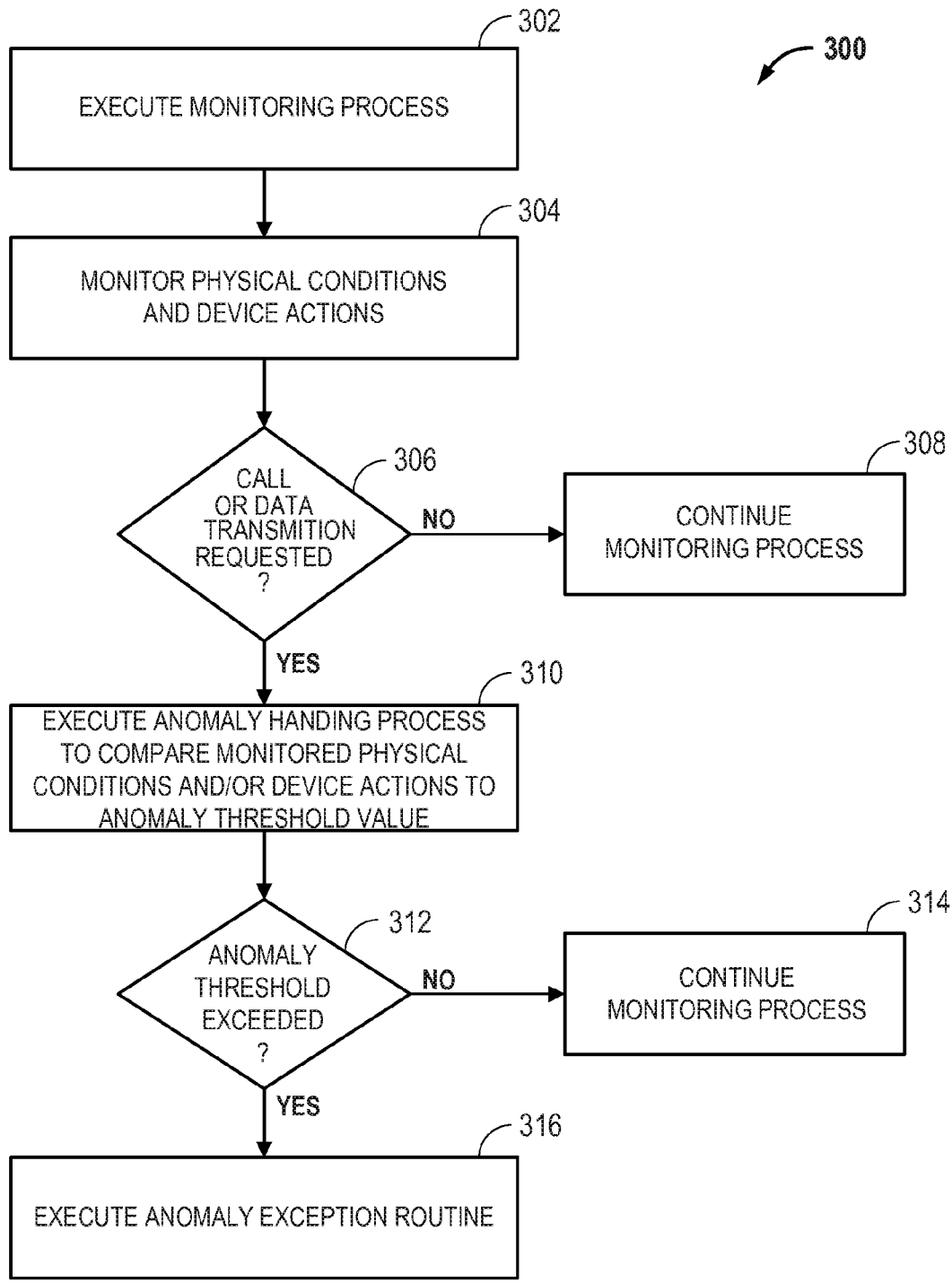
FIG. 3 is a flow diagram that illustrates a process to implement a monitoring process and an anomaly handling process.

With additional reference to FIG. 3, a flow diagram is shown to illustrate a process 300 to implement or execute a monitoring process and an anomaly handling process. At block 302, a monitoring process is implemented or executed. At block 304, a monitoring process to monitor physical conditions associated with the mobile device and device actions associated with the mobile device is implemented or executed. At decision block 306, process 300 determines whether a call or data transmission (e.g., text message) is requested. If not, at block 308, the monitoring process continues.

However, if a call or data transmission (e.g., text message) is requested, then, at block 310, the anomaly handling process is implemented or executed to compare monitored physical conditions and/or device actions to an anomaly threshold value. At decision block 312, if the anomaly threshold value is not exceeded, then the monitoring process is continued (block 314). On the other hand, if the anomaly threshold is exceeded, then an anomaly exception routine is implemented, executed, or performed (block 316). Thus, the anomaly exception routine may be triggered.

As previously described, a variety of physical conditions such as movement, pressure, lighting, as well as, device actions (voice calls, text messages, application usage, Internet usage, etc.), may be monitored by the monitoring process 120. Further, as previously described, weighting factors may be selected for the monitored physical conditions and device actions by the anomaly handling process 122 to determine if the anomaly threshold value has been exceeded.

Figure 4:
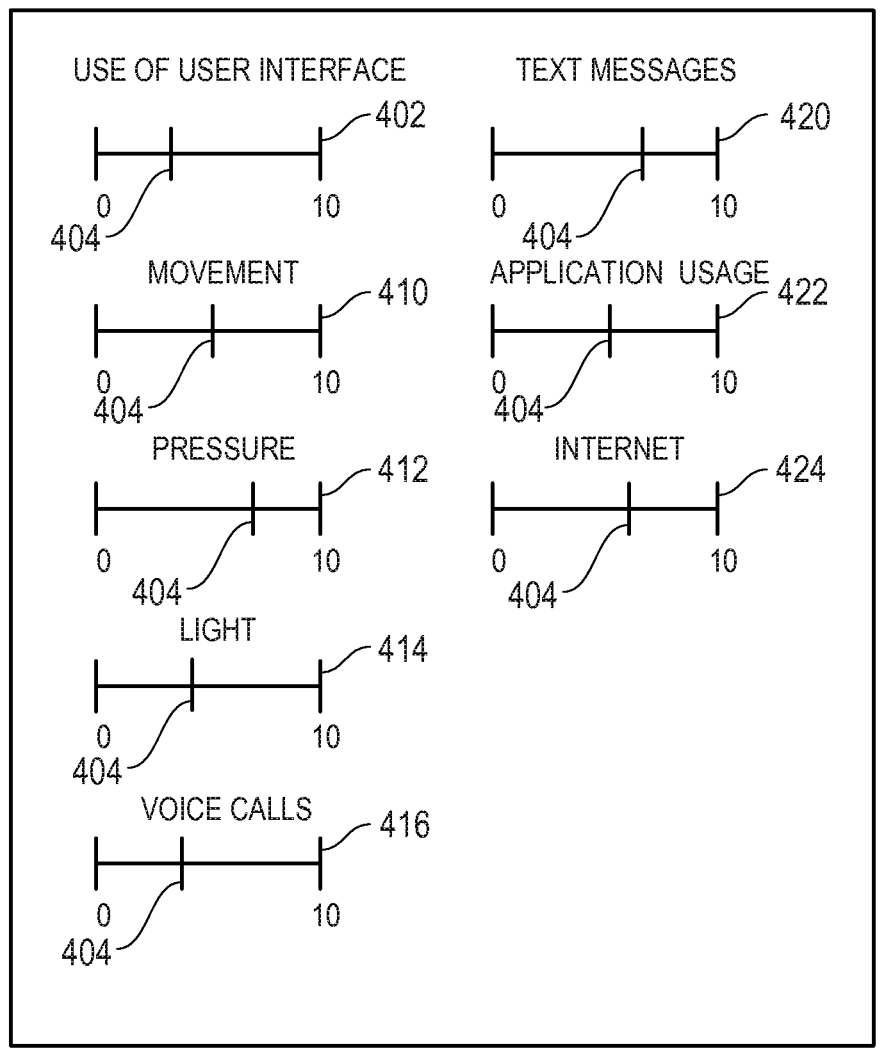
FIG. 4 is a diagram of a variety of different types of monitored physical conditions and monitored device actions, as well as, weighting factors associated with them.

With additional reference to FIG. 4, FIG. 4 is a diagram of a variety of different types of monitored physical conditions and monitored device actions, as well as, weighting factors that may be selected for them for use in the anomaly handling process 122 to determine if an anomaly threshold value has been exceeded. For example, the monitored physical condition related to the use of the user interface 118 by a user is shown by line 402 having a weighting factor 404. In this example, a numerical value of 0-10 is given to the measurement of the monitored physical condition (e.g., use of user interface, movement, pressure, light, etc.) as well as to the weighting factor. The other monitored physical conditions are also illustrated including: movement (line 410), pressure (line 412), and light (line 414). Each of these monitored physical conditions may include a numerical value (0-10) for its measurement and may also include a weighing factor 404.

Further, different device actions may also be monitored, such as: voice calls (line 416), text messages (line 420), application usage (line 422), and Internet usage (line 424). Likewise, each of these monitored device actions may include a numerical value (0-10) for its measurement and may also include a weighing factor 404. Additionally, as will be described, time factors may also be utilized in the measurement of the monitored physical condition and device actions for implementation in the anomaly handling process 122 (e.g., for determining numerical values) to determine if the anomaly threshold value is exceeded.

It should be appreciated that the numerical values of 0-10 for measurement of the monitored physical conditions and device actions, as well as weighting factors, are for illustrative purposes only, and any suitable mathematical scheme may be used. Also, all of these monitored physical conditions and device actions for monitoring by the mobile device have been previously discussed in detail. Further, it should be appreciated that these are only examples and that wide variety of different physical conditions and device actions may be monitored and measured and may be given different types of weighting factors.

As an example, in one aspect, if a call or a data transmission (e.g., text message) is requested, the anomaly handling process 122 is implemented or executed to compare monitored physical conditions (402, 410, 412, and 414) and monitored device actions (416, 420, 422, and 424) to an anomaly threshold value and if the anomaly threshold value is exceeded, the anomaly exception routine is implemented or executed (e.g., the user is required to enter a confirmation via user interface 118, the user is alerted via display device 116 or audio sound, the mobile device 101 is disabled (e.g., disable power 114 or lock the mobile device via processor 110, etc.)).

As a particular example: a call is requested—assume the anomaly threshold value is set to 5; the user interface 118 has not been used in a 12 hour period and the monitored physical condition 402 is set to 7; the pressure sensor 142 has not measured any pressure in a 12 hour period to the mobile device 101 and the monitored physical condition 402 is set to 7; and no voice calls have been made in a 12 hour period and the monitored device action 416 is set to 7. Based upon this, the anomaly handling process 122 may compare an average of the monitored physical conditions and device actions (21/3=7) with the anomaly threshold value (5), which is exceeded, and would implement or execute the anomaly exception routine (e.g., user required to enter a confirmation, alert a user via display device or audio sound, disable mobile device, etc.).

As another example: a text message is requested—assume the anomaly threshold value is set to 5; the user interface 118 was used an hour earlier and the monitored physical condition 402 is set to 1; the accelerometer 140 just measured movement an hour earlier and the monitored physical condition 410 is set to 1; and a text message was just sent an hour earlier and the monitored device action 420 is set to 1. Based upon this, the anomaly handling process 122 may compare an average of the monitored physical conditions and device actions (3/3=1) with the anomaly threshold value (5), which is not exceeded, and the anomaly exception routine is not implemented and the text message is allowed.

It should be appreciated that these are just merely examples, and a wide variety of different types of mathematical techniques may be implemented and a wide variety of different types of monitored physical conditions and device actions may be measured and utilized in the anomaly measurement process. For example, a call may or may not be allowed by the anomaly handling process 122 dependent upon one, some, or all of the monitored physical conditions (402, 410, 412, and 414) and monitored device actions (414, 416, 420, 422, and 424), dependent upon security considerations. As a particular example, a mobile device 101 that was moved 30 minutes earlier before sending a text message may pass the anomaly handling process 122 whereas a mobile device 101 that has not been moved for 2 days before sending a text message may fail the anomaly handling process 122. It should be appreciated that a wide variety of different types of monitored physical conditions and monitored device actions may be utilized or not utilized in various combinations in the anomaly handling process 122, dependent upon security considerations. As an example, dependent upon importance, only one monitored physical condition and/or monitored device action may be utilized to show that the anomaly threshold is exceeded such that the anomaly exception routine is implemented or executed. For example, if a voice call 416 has not been made for 3 days, this may be enough to implement the anomaly exception routine and reject any call or text message.

Further, weight factors 404 may be selected for the monitored physical conditions and the monitored device actions in the anomaly handling process 122 to determine if an anomaly threshold value is exceeded. For example, movement 410 of the mobile device 101 may be given a weight factor 404 as to the importance of when the mobile device was last moved and likewise text messages 420 of the mobile device may be given a weight factor 404 as to the importance of when a text message was last sent. These weight factors may be used as multiplication factors in combination with previously described anomaly handling process 122. There are a wide variety of different types of weight factors that may be utilized in conjunction with the various monitored physical conditions and device actions to determine whether an anomaly exception routine should be executed or implemented when a call number or data transmission (e.g., text message) request is received.

As previously described, an anomaly exception routine may be entered (implemented or executed) by the anomaly handling process 122 (when the anomaly threshold value is exceeded) to prevent a call or text message based upon a wide variety of different environment cues [monitored physical conditions (402, 410, 412, and 414) and monitored device actions (416, 420, 422, and 424)], alone or in combination, as well as based upon weight factors 404 applied to these environmental cues. Any one of these environmental cues (with or without weighting factors) may be sufficient to signal or trigger an anomaly.

Also, in one aspect, when previous calls or text messages have been approved by a user after the anomaly threshold has been met and the anomaly exception routine has been implemented by the anomaly handling process 122, then the weighting factors 404 may be increased for the monitored physical conditions and the monitored device actions in the anomaly handling process 122. Additionally, blocked calls/text messages that were authorized by a user may be stored in memory. It should be appreciated that weight factors may be pre-designated by the anomaly handling process 122 for implementation to determine whether or not an anomaly threshold has been exceeded and, as previously described, may be updated based upon past user action(s).

As previously described, when the anomaly exception routine is implemented or executed, a variety of functions may be implemented or executed. As one example, the user may be required to enter a confirmation (e.g., yes or no) for the requested call or text message through the user interface 118. The anomaly exception routine may alert a user of the requested call or text message by a digital display via the display device 116 or an audio sound. Further, the anomaly exception routine may include disabling the mobile device 101 (e.g., disabling power via power 114 or locking the mobile device 101 via processor 110). It should be appreciated that a wide variety of different types of anomaly exception routines may be utilized to prevent unwanted calls or unwanted text messages (e.g., calls or text messages to unknown numbers or entities—that are not approved the user) by completely stopping them and/or alerting the user.

Aspects of the invention do not replace application authorizations by the mobile device 101, but rather work independently and in addition to them. These previously described monitoring functions of physical conditions and device actions and the anomaly handling process 122 to compare the monitored physical conditions and/or device actions to determine if an anomaly threshold is exceeded provide defense and present an attacker with a significantly greater challenge. In particular, the implementation of anomaly exception routine may prevent a call and/or text message from occurring (whether being done automatically unknown to the user or by the user) and/or notify the user that one has occurred such that the user can prevent future ones. Further, aspects of the invention focus on typical environmental cues that are present when a user intends to place a phone call or send a text message (or any similar action). One cue is that the mobile device 101 is normally being physically manipulated, which may be sensed by an accelerometer 140 or a pressure sensor 142. Another cue is that buttons are physically pushed on the display device 116 or, in the case of a touch-sensitive device, a surface is being physically touched such as the display device 116 or pressure sensor 142, 210. Another cue may be the presence of physical light, both from the environment and the mobile device's display device 116, which may be sensed by camera 144. Another cue is the differences between typical device actions (calls, text messages, application usage, Internet usage, etc.).

When some or all of these environmental cues are not present, the action of sending a text message or placing a call may be anomalous and the anomaly handling process 122 may determine that an anomaly threshold has been exceeded and may execute or implement the anomaly exception routine in which a user must enter in confirmation of the phone call or the text message.

Thus, in accordance to the aspects of the invention, if a call or text message is requested (whether being done automatically without approval by the user or by the user), an anomaly handling process 122 is implemented to compare the monitored physical conditions or device actions of the monitoring process 120 to an anomaly threshold value, wherein if the anomaly threshold value is exceeded, then the anomaly exception routine is implemented. The anomaly exception routine may perform actions such as requesting user confirmation, logging the anomaly, signaling the anomaly by visual or audio alarm, or even disabling the mobile device 110. As previously described, many environmental cues (physical conditions or device actions) may be monitored, such as: use of the user interface by the user, motion or movement of the mobile device, pressure applied to the mobile device, light presence, the timing of previous calls or text messages, application usage, Internet usage, etc. By monitoring these cues, the mobile device 101 may determine whether a call or a text message may be anomalous and appropriate action may be taken. This can prevent an attacker from charging unwanted calls and data transmissions/text messages to a mobile device user or carrier—unbeknownst to the user.

The previously described aspects of the invention, such as, the monitoring process 120, the anomaly process 122, etc., may implemented by processor 110 and may be implemented with software, such as: the application sandbox, the mobile device operating system, wireless modem firmware, etc., or combinations thereof. Additionally, multiple independent implementations may exist at different layers.

The teachings herein may be incorporated into (e.g., implemented within or performed by) a variety of apparatuses (e.g., devices). For example, one or more aspects taught herein may be incorporated into a phone (e.g., a cellular phone), a personal data assistant ("PDA"), a tablet, a mobile computer, a laptop computer, a tablet, an entertainment device (e.g., a music or video device), a headset (e.g., headphones, an earpiece, etc.), a medical device (e.g., a biometric sensor, a heart rate monitor, a pedometer, an EKG device, etc.), a user I/O device, a computer, a point-of-sale device, an entertainment device, a set-top box, or any other suitable device.

These devices may have different power and data requirements. In some aspects, the teachings herein may be adapted for use in low power applications (e.g., through the use of an impulse-based signaling scheme and low duty cycle modes) and may support a variety of data rates including relatively high data rates (e.g., through the use of high-bandwidth pulses).

In some aspects a wireless device may comprise an access device (e.g., a Wi-Fi access point) for a communication system. Such an access device may provide, for example, connectivity to another network (e.g., a wide area network such as the Internet or a cellular network) via a wired or wireless communication link. Accordingly, the access device may enable another device (e.g., a Wi-Fi station) to access the other network or some other functionality. In addition, it should be appreciated that one or both of the devices may be portable or, in some cases, relatively non-portable.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of skill would further appreciate that the various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

The various illustrative logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the embodiments disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

In one or more exemplary embodiments, the functions described may be implemented in hardware, software, firmware, or any combination thereof. If implemented in software as a computer program product, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection is properly termed a computer-readable medium. For example, if the software is transmitted from a web site, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media.

The previous description of the disclosed embodiments is provided to enable any person skilled in the art to make or use the present invention. Various modifications to these embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the principles and novel features disclosed herein.

What is claimed is:

1. A mobile device comprising:
a memory; and
a processor coupled to the memory, the processor to:
monitor at least one of physical conditions and device actions associated with the mobile device; and
if a call or a data transmission is requested, to compare the monitored physical conditions and/or device actions to an anomaly threshold value in an anomaly handling process, to execute an anomaly exception routine if the anomaly threshold value is exceeded, and to select weighting factors for the monitored physical conditions and the monitored device actions in the anomaly handling process to determine if the anomaly threshold value is exceeded, wherein if prior approvals of calls or data transmissions by a user after the anomaly threshold has been met have been implemented, the weighting factors are updated for the monitored physical conditions and the monitored device actions in the anomaly handling process.

2. The mobile device of claim 1, wherein, the data transmission is a text message.

3. The mobile device of claim 1, wherein, the processor is configured to execute the anomaly exception routine including requiring a user to enter a confirmation of the requested call or data transmission through a user interface.

4. The mobile device of claim 1, wherein, the processor is configured to execute the anomaly exception routine including alerting a user of the requested call or data transmission by a visual display on the display device or an audio sound.

5. The mobile device of claim 1, wherein, the processor is configured to execute the anomaly exception routine including disabling the mobile device.

6. The mobile device of claim 1, wherein a monitored physical condition is use of a user interface by a user.

7. The mobile device of claim 1, further comprising an accelerometer, wherein a monitored physical condition is based upon movement of the mobile device measured by the accelerometer.

8. The mobile device of claim 1, further comprising a pressure sensor, wherein a monitored physical condition is based upon pressure sensor readings of the pressure sensor of the mobile device.

9. The mobile device of claim 8, wherein the pressure sensor is located on at least one of a backside, a frontside, or a side of the mobile device.

10. The mobile device of claim 1, further comprising a camera, wherein a monitored physical condition is based upon external environmental light presence or light from a display device measured by the camera.

11. The mobile device of claim 1, wherein device actions include voice calls, text messages, application usage, or Internet usage.

12. The mobile device of claim 1, wherein time factors are utilized in a measurement of the monitored physical condition and device actions for implementation in an anomaly handling process to determine if the anomaly threshold value is exceeded.

13. A method for a mobile device comprising:
performing a monitoring process to monitor at least one of physical conditions and device actions associated with the mobile device; and
if a call or a data transmission is requested, performing an anomaly handling process to compare the monitored physical conditions and/or device actions to an anomaly threshold value, performing an anomaly exception routine if the anomaly threshold value is exceeded, and selecting weighting factors for the monitored physical conditions and the monitored device actions in the anomaly handling process to determine if the anomaly threshold value is exceeded, wherein if prior approvals of calls or data transmissions by a user after the anomaly threshold has been met have been implemented, the weighting factors are updated for the monitored physical conditions and the monitored device actions in the anomaly handling process.

14. The method of claim 13, wherein, the data transmission is a text message.

15. The method of claim 13, wherein, performing the anomaly exception routine comprises requiring a user to enter a confirmation of the requested call or data transmission.

16. The method of claim 13, wherein, performing the anomaly exception routine includes alerting a user of the requested call or data transmission by a visual display or an audio sound.

17. The method of claim 13, wherein, performing the anomaly exception routine includes disabling the mobile device.

18. The method of claim 13, wherein a monitored physical condition is based upon use of a user interface by a user.

19. The method of claim 13, wherein a monitored physical condition is based upon movement of the mobile device.

20. The method of claim 13, wherein a monitored physical condition is based upon pressure sensor readings of a pressure sensor of the mobile device.

21. The method of claim 13, wherein a monitored physical condition is based upon external environmental light presence.

22. The method of claim 13, wherein device actions include voice calls, text messages, application usage, or Internet usage.

23. The method of claim 13, wherein time factors are utilized in a measurement of the monitored physical condition and device actions for implementation in the anomaly handling process to determine if the anomaly threshold value is exceeded.

24. A computer program product comprising:
a non-transitory computer-readable medium comprising code for:
performing a monitoring process to monitor at least one of physical conditions and device actions associated with the mobile device; and
if a call or a data transmission is requested, performing an anomaly handling process to compare the monitored physical conditions and/or device actions to an anomaly threshold value, performing an anomaly exception routine if the anomaly threshold value is exceeded, and selecting weighting factors for the monitored physical conditions and the monitored device actions in the anomaly handling process to determine if the anomaly threshold value is exceeded, wherein if prior approvals of calls or data transmissions by a user after the anomaly threshold has been met have been implemented, the weighting factors are updated for the monitored physical conditions and the monitored device actions in the anomaly handling process.

25. The computer program product of claim 24, wherein, the data transmission is a text message.

26. The computer program product of claim 24, wherein, the anomaly exception routine further comprises code for requiring a user to enter a confirmation of the requested call or data transmission.

27. The computer program product of claim 24, wherein, the anomaly exception routine further comprises code for alerting a user of the requested call or data transmission by a visual display or an audio sound.

28. The computer program product of claim 24, wherein, the anomaly exception routine further comprises code for disabling the mobile device.

29. The computer program product of claim 24, wherein a monitored physical condition is based upon use of a user interface by a user.

30. The computer program product of claim 24, wherein a monitored physical condition is based upon movement of the mobile device.

31. The computer program product of claim 24, wherein a monitored physical condition is based upon pressure sensor readings of a pressure sensor of the mobile device.

32. The computer program product of claim 24, wherein a monitored physical condition is based upon external environmental light presence.

33. The computer program product of claim 24, wherein device actions include voice calls, text messages, application usage, or Internet usage.

34. The computer program product of claim 24, further comprising code for selecting time factors for utilization in a measurement of the monitored physical condition and device actions for implementation in the anomaly handling process to determine if the anomaly threshold value is exceeded.

35. A mobile device comprising:
means for performing a monitoring process to monitor at least one of physical conditions and device actions associated with the mobile device;
means for performing an anomaly handling process to compare the monitored physical conditions and/or device actions of the monitoring process to an anomaly threshold value; and
means for performing an anomaly exception routine if the anomaly threshold value is exceeded; and
means for selecting weighting factors for the monitored physical conditions and the monitored device actions in the anomaly handling process to determine if the anomaly threshold value is exceeded, wherein if prior approvals of calls or data transmissions by a user after the anomaly threshold has been met have been implemented, the weighting factors are updated for the monitored physical conditions and the monitored device actions in the anomaly handling process.

36. The mobile device of claim 35, wherein, the data transmission is a text message.

37. The mobile device of claim 35, wherein, the anomaly exception routine includes means for requiring a user to enter a confirmation of the requested call or data transmission.

38. The mobile device of claim 35, wherein, the anomaly exception routine includes means for alerting a user of the requested call or data transmission by a visual display or an audio sound.

39. The mobile device of claim 35, wherein, the anomaly exception routine includes means for disabling the mobile device.

40. The mobile device of claim 35, wherein a monitored physical condition is based upon use of a user interface by a user.

41. The mobile device of claim 35, further comprising means for measuring movement of the mobile device, wherein a monitored physical condition is based upon movement of the mobile device.

42. The mobile device of claim 35, further comprising means for reading pressure against the mobile device, wherein a monitored physical condition is based upon reading pressure against the mobile device.

43. The mobile device of claim 35, further comprising means for determining external light presence, wherein a monitored physical condition is based upon external environmental light presence.

44. The mobile device of claim 35, wherein device actions include voice calls, text messages, application usage, or Internet usage.

* * * * *